(12) United States Patent
Lee et al.

(10) Patent No.: US 10,795,464 B2
(45) Date of Patent: Oct. 6, 2020

(54) METHOD FOR OPERATING TOUCH PAD AND ELECTRONIC DEVICE FOR SUPPORTING SAME

(71) Applicant: SAMSUNG ELECTRONICS CO., LTD., Suwon-si, Gyeonggi-do (KR)

(72) Inventors: Sung Jun Lee, Suwon-si (KR); Jeong Jin Lee, Seoul (KR); Soo Hyun Seo, Anyang-si (KR); Bo Hwa Chung, Seoul (KR); Min Jung Kim, Hwaseong-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/334,952

(22) PCT Filed: Sep. 21, 2017

(86) PCT No.: PCT/KR2017/010389
§ 371 (c)(1),
(2) Date: Mar. 20, 2019

(87) PCT Pub. No.: WO2018/056715
PCT Pub. Date: Mar. 29, 2018

(65) Prior Publication Data
US 2019/0278393 A1 Sep. 12, 2019

(30) Foreign Application Priority Data
Sep. 21, 2016 (KR) .......................... 10-2016-0120385

(51) Int. Cl.
*G06F 3/0354* (2013.01)
*G06F 3/0485* (2013.01)
(Continued)

(52) U.S. Cl.
CPC .......... *G06F 3/03547* (2013.01); *G06F 3/041* (2013.01); *G06F 3/0485* (2013.01); *G06F 3/0488* (2013.01); *G06F 3/04883* (2013.01)

(58) Field of Classification Search
CPC .... G06F 3/03547; G06F 3/041; G06F 3/0485; G06F 3/0488; G06F 3/04883
See application file for complete search history.

(56) References Cited

U.S. PATENT DOCUMENTS 7,394,453 B2   7/2008  Woolley et al.
8,775,966 B2 * 7/2014  Stolyarov ............. G06F 1/1626
                                                  715/784

(Continued)

FOREIGN PATENT DOCUMENTS

JP       2016-133827     7/2016
KR   10-2007-0034192    3/2007
(Continued)

OTHER PUBLICATIONS

International Search Report for PCT/KR2017/010389, dated Jan. 9, 2018 and English-language translation, 4 pages.
(Continued)

*Primary Examiner* — Sejoon Ahn
(74) *Attorney, Agent, or Firm* — Nixon & Vanderhye, P.C.

(57) ABSTRACT

An electronic device includes a display displaying an execution screen of an application, a touch pad receiving a user input associated with control of the execution screen, and a processor controlling scroll processing of the execution screen. The processor is configured to divide the touch pad into a plurality of virtual regions and to add a first threshold value of a minimum magnitude for determining that the continuous user input is a scroll control input of the execution screen to the second coordinates when the user input is continuous from first coordinates of a first virtual region to (Continued)

second coordinates of a second virtual region adjacent to the first virtual region at a specified speed or more.

10 Claims, 14 Drawing Sheets

(51) Int. Cl.
*G06F 3/0488* (2013.01)
*G06F 3/041* (2006.01)

(56) References Cited

U.S. PATENT DOCUMENTS

| | | | |
|---|---|---|---|
| 10,201,903 B1* | 2/2019 | Linnell | G06F 3/03547 |
| 2004/0257921 A1* | 12/2004 | Nishimura | G06F 3/04817 |
| | | | 369/30.08 |
| 2005/0146534 A1* | 7/2005 | Fong | G06F 3/0219 |
| | | | 345/619 |
| 2006/0033721 A1 | 2/2006 | Woolley et al. | |
| 2006/0200573 A1* | 9/2006 | Lin | G06F 1/3203 |
| | | | 709/231 |
| 2007/0024595 A1* | 2/2007 | Baker | G06F 3/045 |
| | | | 345/173 |
| 2008/0042984 A1 | 2/2008 | Lim et al. | |
| 2008/0273018 A1 | 11/2008 | Woolley et al. | |
| 2011/0227845 A1 | 9/2011 | Lin et al. | |
| 2012/0144330 A1* | 6/2012 | Flint | G06F 3/04847 |
| | | | 715/765 |
| 2014/0145984 A1 | 5/2014 | Yoon et al. | |
| 2014/0178027 A1* | 6/2014 | Lee | H04N 5/77 |
| | | | 386/201 |
| 2017/0031591 A1* | 2/2017 | Lee | G06F 3/0488 |
| 2017/0083694 A1* | 3/2017 | Mardikar | G06F 21/32 |
| 2018/0224298 A1* | 8/2018 | Jeong | G01C 21/3614 |

FOREIGN PATENT DOCUMENTS

| | | |
|---|---|---|
| KR | 10-0750159 | 8/2007 |
| KR | 10-0781706 | 12/2007 |
| KR | 10-2010-0094086 | 8/2010 |
| KR | 10-2014-0066384 | 6/2014 |

OTHER PUBLICATIONS

Written Opinion of the ISA for PCT/KR2017/010389, dated Jan. 9, 2018, 5 pages.

* cited by examiner

METHOD FOR OPERATING TOUCH PAD AND ELECTRONIC DEVICE FOR SUPPORTING SAME

This application is the U.S. national phase of International Application No. PCT/KR2017/010389 filed 21 Sep. 2017, which designated the U.S. and claims priority to KR Patent Application No. 10-2016-0120385 filed 21 Sep. 2016, the entire contents of each of which are hereby incorporated by reference.

TECHNICAL FIELD

The disclosure relates to a technology for processing the scroll of a screen based on a touch pad.

DESCRIPTION OF RELATED ART

The recently developed electronic device is equipped with various functions to satisfy the needs of users. For example, the electronic device has been developed as the multi-functional media that support functions such as online games, financial transaction services, multimedia content viewing, and the like as well as high-quality voice and video calls.

As the multi-function is installed in the electronic device, the display screen supporting the multi-function has been gradually enlarged and then finally has become the touch screen. However, it is not easy for a user to operate a touch screen of a large area by using one hand, and the user needs to use another hand other than the hand holding the electronic device. In addition, the visibility of the content displayed on a screen may be reduced by the body (e.g., finger) located on the touch screen, and thus the feeling of immersion may be reduced.

SUMMARY

Various embodiments of the disclosure may provide an electronic device capable of controlling the display screen with a minimum action or minimum movement, using a touch pad physically spaced from a display screen.

In addition, various embodiments of the disclosure may provide an electronic device capable of determining and processing an input event applied to a touch pad.

An electronic device according to an embodiment may include a display displaying an execution screen of an application, a touch pad receiving a user input associated with control of the execution screen, and a processor controlling scroll processing of the execution screen.

According to an embodiment, the processor may be configured to divide the touch pad into a plurality of virtual regions and to add a first threshold value of a minimum magnitude for determining that the continuous user input is a scroll control input of the execution screen, to the second coordinates when the user input is continuous from first coordinates of a first virtual region to second coordinates of a second virtual region adjacent to the first virtual region at a specified speed or more.

According to various embodiments, it is possible to easily control the display screen with only the hand holding an electronic device.

According to various embodiments, it is possible to clearly determine and process the signal of a user input event based on a plurality of virtual regions assigned to a touch pad.

Besides, a variety of effects directly or indirectly understood through this disclosure may be provided.

DETAILED DESCRIPTION OF EXAMPLE EMBODIMENTS

Figure 1A:
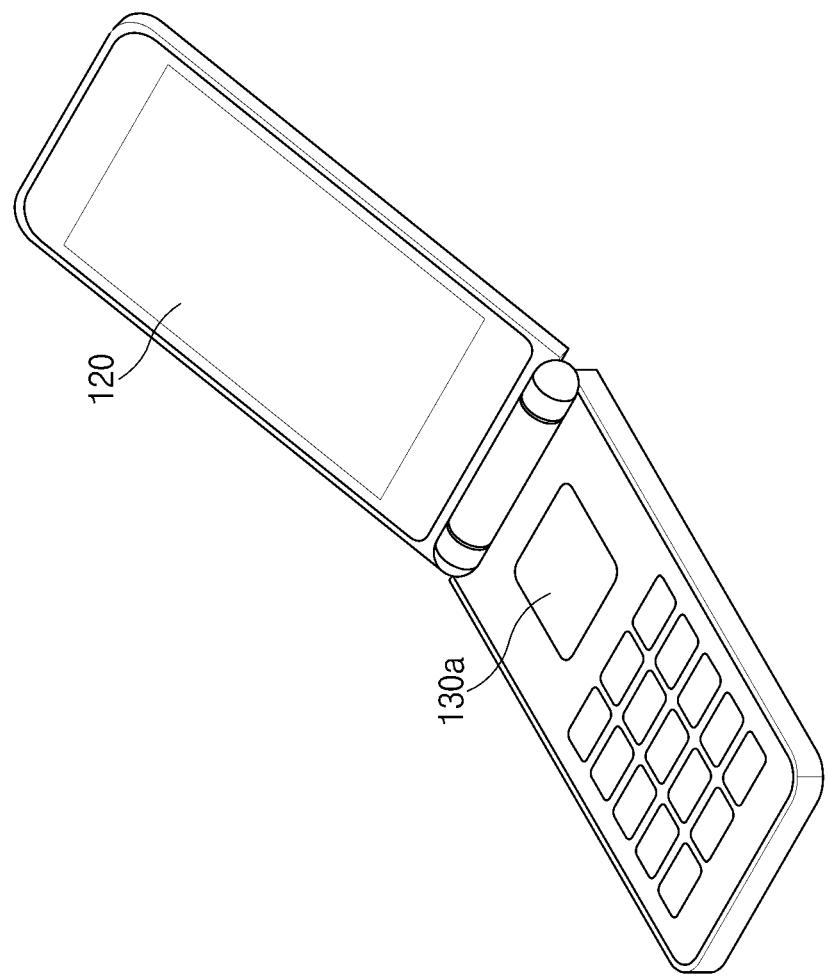
FIG. 1A is a view illustrating an electronic device, according to an embodiment.
Figure 1A:
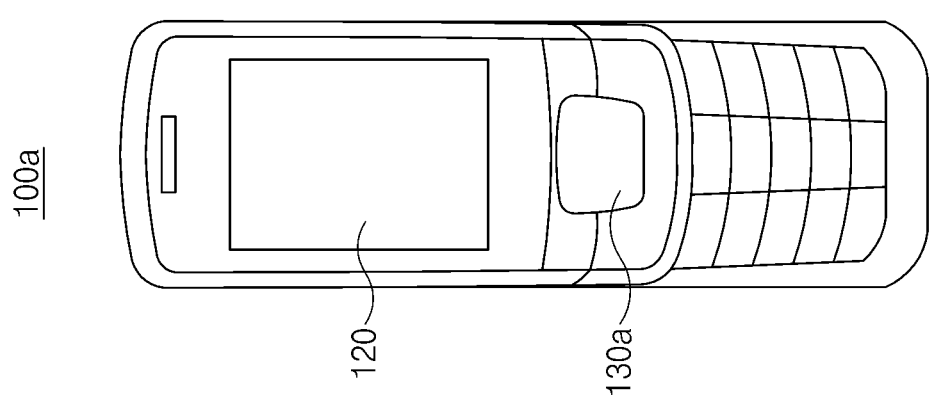

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

Figure 1B:
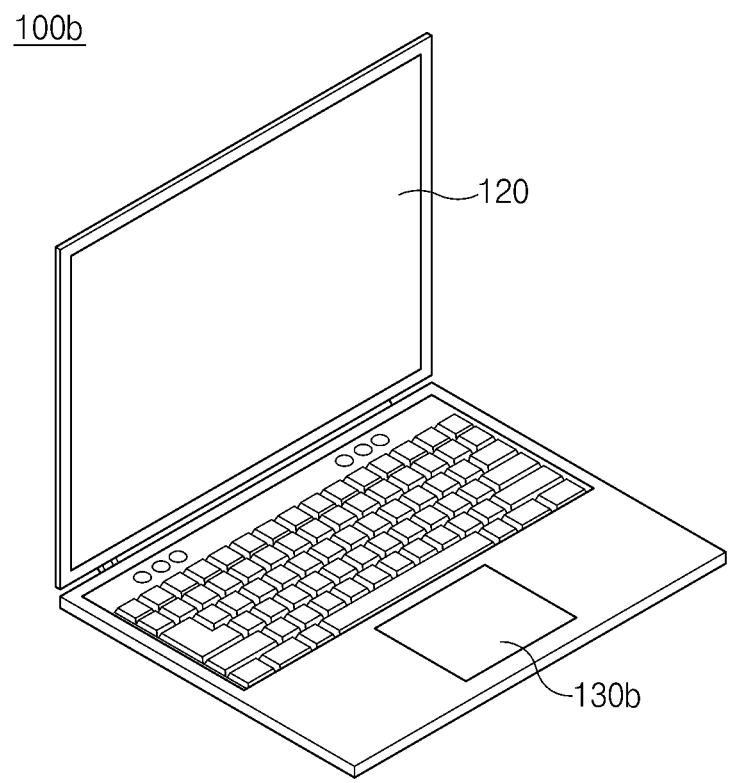
FIG. 1B is a view illustrating an electronic device, according to another embodiment.
Figure 1C:
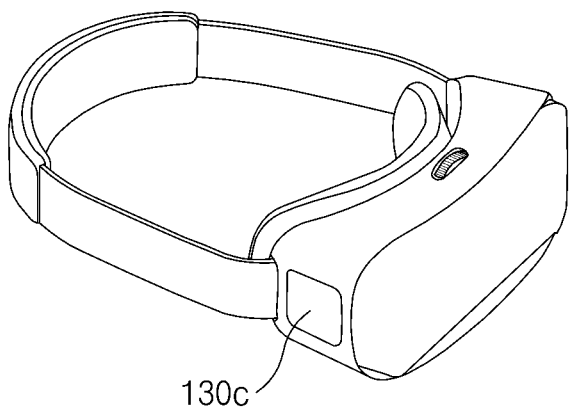
FIG. 1C is a view illustrating an electronic device, according to still another embodiment.

FIGS. 1A to 1C illustrate views illustrating an electronic device, according to an embodiment of the disclosure.

Referring to FIGS. 1A to 1C, an electronic device 100a, 100b, or 100c may include various types of devices capable of executing a specified input processing system in response to a user input (e.g., touch, sweep, drag, or the like) applied from a user. For example, the electronic device 100a, 100b, or 100c may include at least one of a mobile device (e.g., a smartphone of a slide, or a flip or folder type), a computing device (e.g., a laptop PC, or the like), and a wearable device (e.g., a head-mounted display device, or the like).

In an embodiment, the electronic devices 100a, 100b, or 100c may include an input device (e.g., a touch pad 130a, 130b, or 130c) capable of receiving a user input and a display 120 (including a display mounted on the wearable device) that interacts with the input device. The touch pad 130a, 130b, or 130c may control the feedback object (e.g., a cursor or a focus) in the screen displayed by the display 120 or may be used to control the functional execution (e.g., screen scroll) associated with the operation of the screen.

In an embodiment, the touch pad 130a, 130b, or 130c may include at least one electrode layer. In this regard, the touch pad 130a, 130b, or 130c may detect the coordinates in which a user input is generated (or applied), based on the change in voltage (e.g., resistance film type) due to physical contact between the electrode layers. Alternatively, the touch pad 130a, 130b, or 130c may detect the coordinates of the user input, based on the capacitance change of the electrode layer (e.g., capacitance type) by charge induction. The electronic devices 100a, 100b, or 100c may process the screen of the display 120 corresponding to the user input, based on the coordinates of the detected user input.

In various embodiments, the touch pad 130a, 130b, or 130c may be disposed in an area physically spaced from the display 120. For example, in the case of the electronic device 100a or 100b of the folder or slide structure, the touch pad 130a or 130b may be provided in a region (e.g., a key pad) held by the user or a region (e.g., palm rest) where the user's body (e.g., hand) is contacted. In the case of the electronic device 100c worn on a part of the user's body, the touch pad 130c may be provided in a region where the location of the touch pad 130c is easily recognizable and accessible. As such, in a process of operating the electronic device 100a or 100b, a user may apply a user input to the touch pad 130a or 130b with a minimum action (e.g., one hand) or minimum movement. Hereinafter, an embodiment in which an electronic device is implemented as a mobile device (e.g., a smartphone in the form of a folder) will be exemplified.

Figure 2:
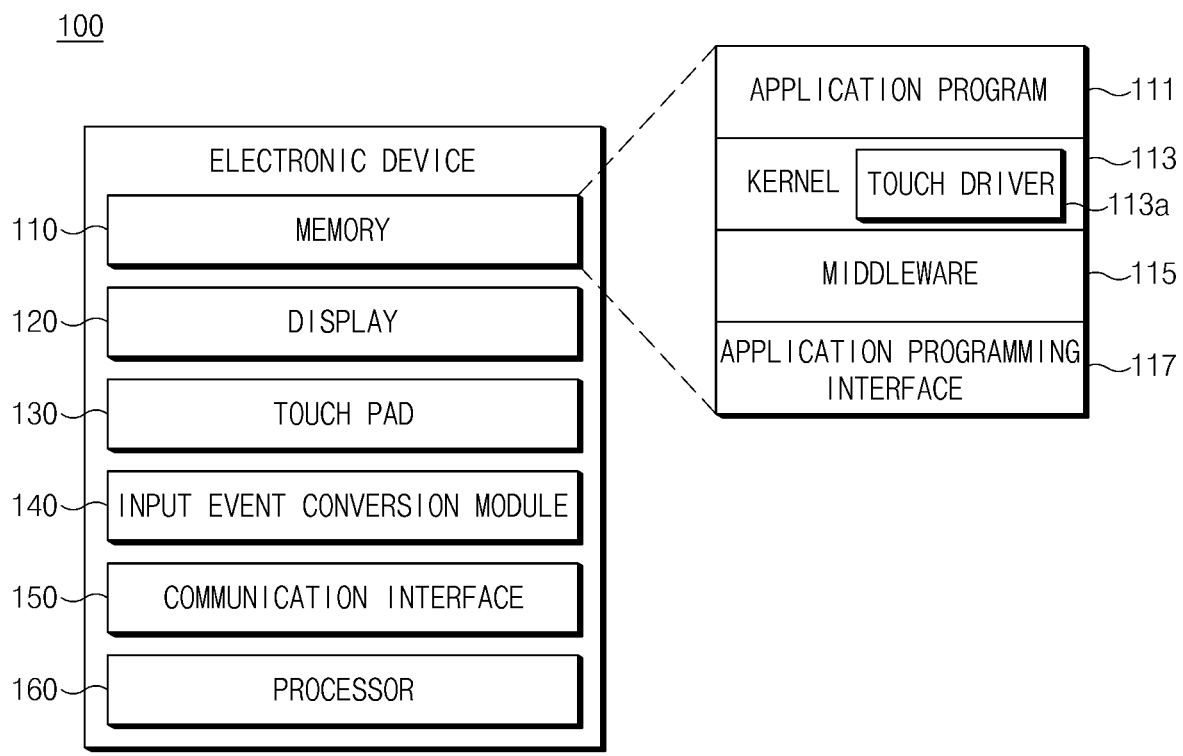
FIG. 2 is a view illustrating a configuration of an electronic device according to an embodiment.

FIG. 2 is a view illustrating a configuration of an electronic device according to an embodiment.

Referring to FIG. 2, an electronic device 100 may include a memory 110, the display 120, a touch pad 130, an input event conversion module 140, a communication interface 150, or a processor 160. In an embodiment, the electronic device 100 may not include at least one of the above-described elements or may further include any other element(s).

In an embodiment, the memory 110 may store at least one program associated with the screen displayed on the display 120. The program may include an application program 111, a kernel 113, a middleware 115, or an application programming interface (API) 117. At least a part of the kernel 113, the middleware 115, or the API 117 may be called an "operating system (OS)".

The kernel 113 may control or manage system resources (e.g., the memory 110, the processor 160, and the like) that are used to execute operations or functions implemented in other programs (e.g., the application program 111, the middleware 115, the API 117).

The middleware 115 may perform, for example, a mediation role such that the application program 111 or the API 117 can communicate with the kernel 113 to transmit or receive data. Furthermore, the middleware 115 may process one or more task requests received from the application program 111 according to a priority. For example, the middleware 115 may assign the priority, which makes it possible to use a system resource (e.g., the memory 110, the processor 160, or the like) of the electronic device 100, to at least one of the application program 111. The middleware 115 may perform scheduling, load balancing, or the like on the one or more task requests based on the priority.

The API 117 may be an interface through which the application program 111 controls a function provided by the kernel 113 or the middleware 115, and may include, for example, at least one interface or function (e.g., an instruction) for a file control, a window control, image processing, a character control, or the like.

In various embodiments, the memory 110 may store data associated with at least another component of the electronic device 100. For example, the memory 110 may store data associated with the operation of the user's touch pad 130 on a screen (e.g., a locked screen or a home screen) scheduled in the electronic device 100 or on an execution screen of the application program 111.

In various embodiments, the memory 110 may include at least one of a volatile memory (e.g., a dynamic random access memory (DRAM), a static RAM (SRAM), or a synchronous DRAM (SDRAM)), or a nonvolatile memory (e.g., a one-time programmable read only memory (OTPROM), a programmable ROM (PROM), an erasable and programmable ROM (EPROM), an electrically erasable and programmable ROM (EEPROM)), a mask ROM, a flash ROM, a flash memory or the like.

The display 120 may display various content (e.g., texts, images, video, icons, symbols, or the like). For example, the display 120 may display the execution screen associated with the at least one application program 111 stored in the memory 110, under the control of the processor 160. Alternatively, the display 120 may display a screen (e.g., a locked screen, a home screen, or the like) corresponding to scheduling information set in the electronic device 100. A feedback object (e.g., a cursor, a focus, etc.) or a graphical user interface that interacts with a user input applied to the touch pad 130 may be displayed on at least one of the screens.

In various embodiments, the display 120 may include, for example, a liquid crystal display (LCD), a light-emitting diode (LED) display, an organic LED (OLED) display, a microelectromechanical systems (MEMS) display, or an electronic paper display.

The touch pad 130 may receive the input (e.g., touch, sweep, drag, or the like) associated with the control of a screen (e.g., a locked screen or a home screen) scheduled to the electronic device 100 or the execution screen control of the application program 111, from a user (or a touch pen). In an embodiment, the touch pad 130 may be disposed in at least one region of the physical key pad included in the electronic device 100. For example, the touch pad 130 may be disposed in a region including a direction key and a check key (or OK key) in the key pad region.

In various embodiments, the touch pad 130 may include a structure in which the direction key and the check key are stacked, or may include a structure of a single touch pad capable of performing all the functions of the direction key and the check key. In various embodiments, the touch pad 130 may be referred to as a slide pad or a track pad.

The input event conversion module 140 may control the function associated with the operation of the touch pad 130 or may transmit data associated with the operation of the touch pad 130 to other components (e.g., the application program 111, the middleware 115, or the like executed by the processor 160) of the electronic device 100. In various embodiments, the input event conversion module 140 may be included in a touch driver 113a installed in the kernel 113. In this regard, the input event conversion module 140 may include instructions or data associated with the operation of the touch pad 130, and the instructions or data may be stored in the nonvolatile region (e.g., non-volatile memory) of the memory 110. In this case, the processor 160 may process the instruction or data stored in the nonvolatile area after loading the instruction or data on a volatile area (e.g., a volatile memory) of the memory 110 and may store the processed data in the nonvolatile area. For example, the processor 160 may load the input event conversion module 140 on the volatile memory so as to be processed depending on a specified program routine.

In an embodiment, the input event conversion module 140 may divide the top surface (or cover) region of the touch pad 130, to which a user input (e.g., touch, sweep, or drag) is applied, into a plurality of virtual regions. For example, the input event conversion module 140 may group the coordinates of the internal electrode layer of the touch pad 130 within a specified range and may assign one virtual region for each group.

In an embodiment, the input event conversion module 140 may detect at least one virtual region to which the user input is applied and user input coordinates in the corresponding virtual region and may transmit data thereof to the processor 160. Furthermore, the input event conversion module 140 may detect the speed of a user input (e.g., sweep) that occurs continuously in a plurality of coordinates. For example, the input event conversion module 140 may perform a series of arithmetic operations based on the distance between the coordinates of the start point and coordinates of the end point for continuous user inputs and the time at which each of coordinates is detected, to detect the speed for the user input, and may transmit data of the detected speed to the processor 160. In various embodiments, the function operation of the input event conversion module 140 described above may be performed by a separate touch integrated circuit (IC) electrically connected to the touch pad 130. Alternatively, the function operation of the input event conversion module 140 may be performed by the processor 160 described below.

The communication interface 150 may establish communication between the electronic device 100 and an external device. For example, the communication interface 150 may be connected to a network over wireless communication or wired communication, thus communicating with the external device.

In various embodiments, the wireless communication may include long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). In addition, the wireless communication may include short-range communication, and the short-range communication may include, for example, Wireless Fidelity (Wi-Fi), Bluetooth, Near Field Communication (NFC), or magnetic stripe transmission (MST).

The processor 160 may be electrically connected to at least one or more components of the electronic device 100 to perform control, communication operations, or data processing on the components. In this regard, the processor 160 may determine the characteristic of the user input based on the coordinates or speed data of the user input. For example, when the user input is implemented with single coordinates, the processor 160 may determine the user input as a touch operation. Alternatively, when the user input is implemented with a plurality of coordinates, the processor 160 may determine the user input as either the sweep operation or the drag operation. In this operation, when the speed between the coordinates of the start point and the coordinates of the end point according to a user input among the plurality of coordinates is not less than the specified speed, the processor 160 may determine the user input as a sweep operation. The processor 160 may control a screen (e.g., a locked screen, a home screen, or the like) scheduled to the electronic device 100 or an execution screen of the application program 111, based on the determined characteristic of the user input.

In an embodiment, for example, with regard to the processing of the user input occurring on the touch pad 130, the processor 160 may set at least one function to the input event conversion module 140. For example, when the coordinates and speed according to the user input satisfy the specified condition, the processor 160 may set a function to display a feedback object (e.g., a cursor, a focus, or the like) on the screen (e.g., a locked screen, a home screen, or the like) scheduled to the electronic device 100 or the execution screen of the application program 111, to the input event conversion module 140. This will be described with reference to FIGS. 3A and 3B described later.

Figure 3A:
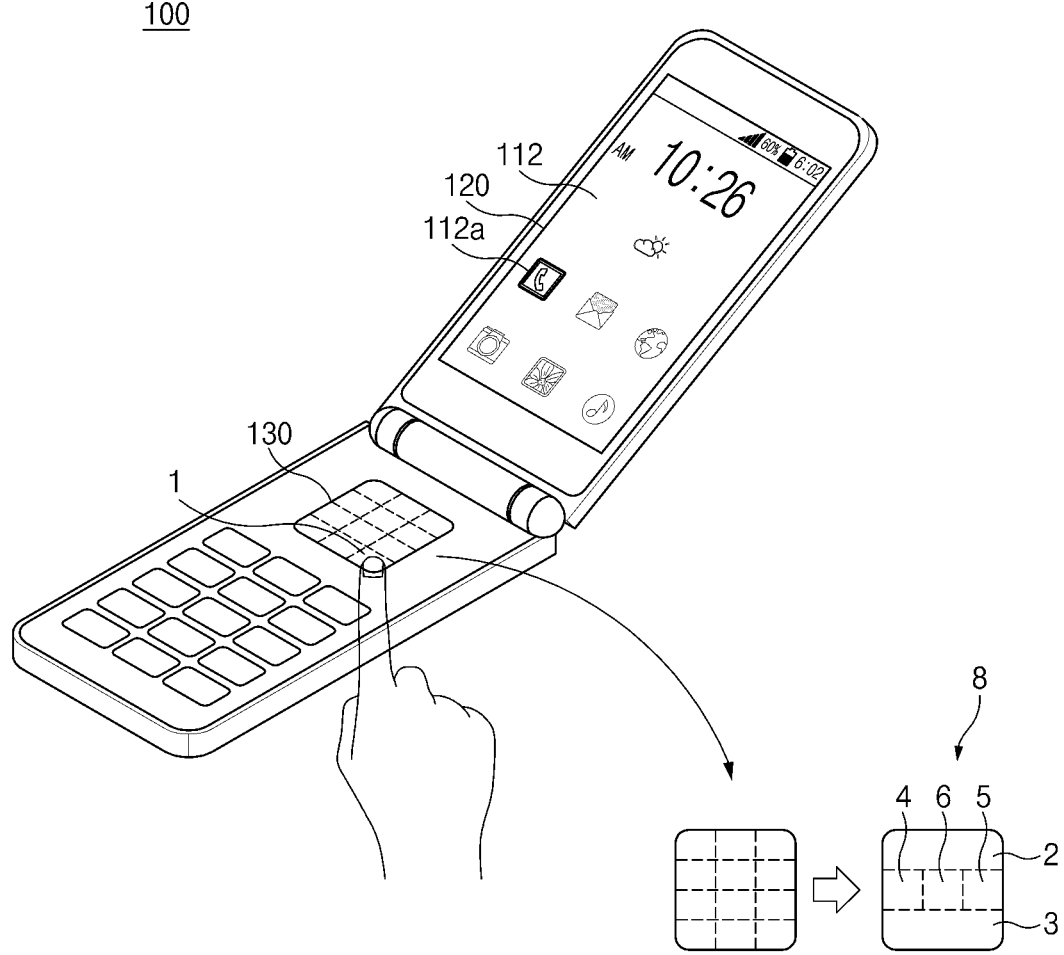
FIG. 3A is a view illustrating one example in which a feedback object is generated based on a touch pad, according to an embodiment.
Figure 3B:
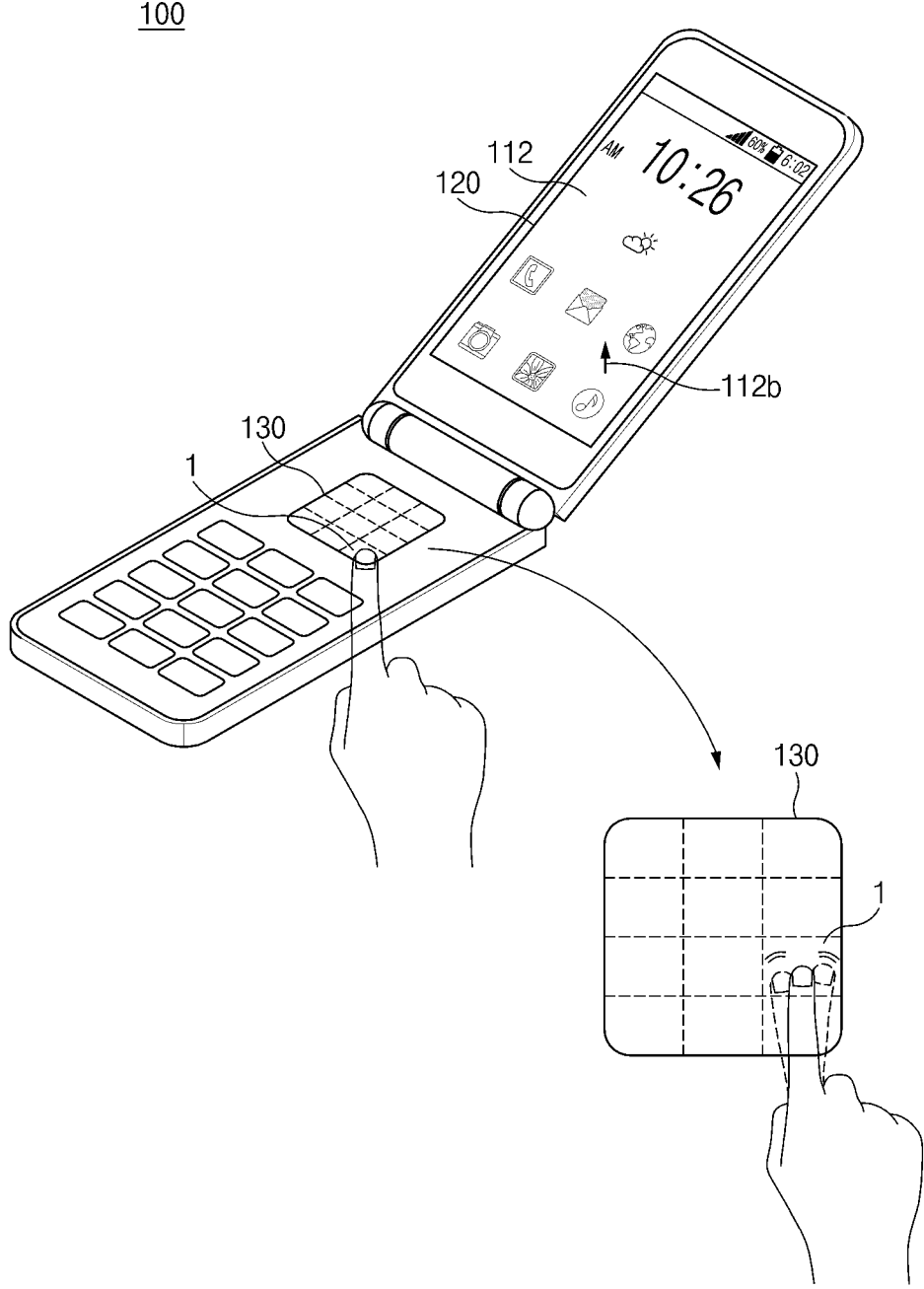
FIG. 3B is a view illustrating another example in which a feedback object is generated based on a touch pad, according to an embodiment.

FIGS. 3A and 3B are views illustrating various examples in each of which a feedback object is generated based on a touch pad, according to an embodiment.

In an embodiment, the input event conversion module 140 of FIG. 2 may be operated as a first function, a second function, or a third function with regard to the above-described function. For example, the input event conversion module 140 may be operated as the first function capable of controlling the scroll processing for the execution screen of the arbitrary application program 111 of FIG. 2 or the home screen of the electronic device 100. Alternatively, the input event conversion module 140 may be operated as the second function or the third function that is capable of controlling the generation and operation of the feedback object (e.g., a focus, a cursor, or the like) on the execution screen or the home screen. In an embodiment, the initial function of the input event conversion module 140 may be operated as the first function supporting scroll. Alternatively, when the user input does not occur during the specified time in the state of the second function or the third function, the function of the input event conversion module 140 may be switched from the second function or the third function to the first function and may be operated, under the control of the processor 160 of FIG. 2.

Referring to FIG. 3A, the touch pad 130 may be divided into a plurality of virtual regions (e.g., lattice-shaped regions) by the input event conversion module 140. In this case, when a user input (e.g., touch) is applied to a first virtual region 1 among the plurality of virtual regions, the input event conversion module 140 may detect the coordinates of the user input to transmit the coordinates to the processor 160. The processor 160 may determine the characteristic of the user input based on the transmitted coordinates. Alternatively, the processor 160 may calculate a period in which the user input is maintained, on the transmitted coordinates.

In an embodiment, when the user input is implemented with single coordinates and it is determined that the user input is a touch operation and the touch operation is held during a specified time or more, the processor 160 may change the function of the input event conversion module 140 to the second function. For example, the processor 160 may allow the first function (e.g., scroll support function), which is the initial function of the input event conversion module 140, to be inactive and may activate the second function capable of operating a focus object 112*a* on the screen by the display 120. As such, the focus object 112*a* may be displayed in at least part of a region of a home screen 112 (or a locked screen or the execution screen of the arbitrary application program 111) displayed on the display 120. For example, the focus object 112*a* may be a display object that visually displays the user's control for selecting or activating one of at least one UI object (e.g., an icon associated with application program 111) displayed on the home screen 112 (or web page screen, or the like).

In an embodiment, when the function is switched to the second function, the input event conversion module 140 may change the configuration of a plurality of virtual regions for the touch pad 130. For example, the input event conversion module 140 may change the plurality of lattice-shaped virtual regions to a plurality of virtual regions 8 of the key pad type including regions of up 2, down 3, left 4, right 5, and check 6. In this case, the regions of up 2, down 3, left 4, right 5, and check 6 may function as a physical key that receives a user input (e.g., touch) associated with the movement of the focus object 112*a* or the activation control of an arbitrary UI object through the focus object 112*a*. The input event conversion module 140 may generate the value of a key code (e.g., key code or ASCII code) corresponding to the coordinates of the user input applied to at least one region of the regions of up 2, down 3, left 4, right 5, and check 6 to transmit the value of a key code to the running application program 111 of FIG. 2, the middleware 115 of FIG. 2, or the like.

As illustrated in FIG. 3B, with regard to the function switch of the input event conversion module 140, the user input may be continuous in the form of a drag in the first virtual region 1 of the touch pad 130. The processor 160 may determine the characteristic of the user input, based on the coordinates and the speed of the user input transmitted from the input event conversion module 140.

In an embodiment, when the user input is implemented with a plurality of coordinates and the speed of the plurality of coordinates is less than a specified speed, the processor 160 may determine the user input as a drag operation. At this time, when all the plurality of coordinates of the user input are dependent on the first virtual region 1, the processor 160 may switch the function of the input event conversion module 140 from the first function (e.g., scroll support function) to the third function. For example, the third function may be a function to display a cursor object 112*b* on at least part of a region of the home screen 112 (or a locked screen, or the execution screen of the arbitrary application program 111) displayed on the display 120.

In various embodiments, the processor 160 may switch the function of the input event conversion module 140 to the function corresponding to the specific screen with respect to the specific screen displayed on the display 120. In this regard, the processor 160 may store the data associated with the functional operation of the input event conversion module 140 in a database of the memory 110 of FIG. 2. For example, the processor 160 may count the number of times that each of the first function, the second function, or the third function is operated on the execution screen of the first application program and may manage the number of times in the database. According to an embodiment, the number of times that the specific function of the input event conversion module 140 is operated for the execution screen of the first application program on the database may be greater than a specified threshold value or may be greater than the number of times that the remaining functions are operated. In this case, upon executing the first application program, the processor 160 may control the function of the input event conversion module 140 as a function that is greater than the specified threshold value or is operated relatively more.

In addition to the execution screen of the application program thereafter, the function control of the input event conversion module 140 according to the number of operations described above may be implemented on a screen (e.g., a home screen) scheduled to the electronic device 100. In this regard, as described above, the processor 160 may count the number of times that each of the first function, the second function, or the third function is operated on the home screen of the electronic device 100 and may manage the number of times in the database. When the number of times that specific function of the input event conversion module 140 is operated on the database is greater than the specified threshold value or is greater than the number of time that another function is operated, the processor 160 may control the function of the input event conversion module 140 as a function, which is greater than the specified threshold value or is operated relatively more, with respect to the home screen of the electronic device 100 output thereafter. For example, when the processor 160 controls the unlock of the electronic device 100 or controls the execution termination of an arbitrary application program, in response to the user's control, the processor 160 may output the home screen and may control the function of the input event conversion module 140 as a function, which is operated is greater than the threshold value, or the function is operated relatively more.

Figure 4A:
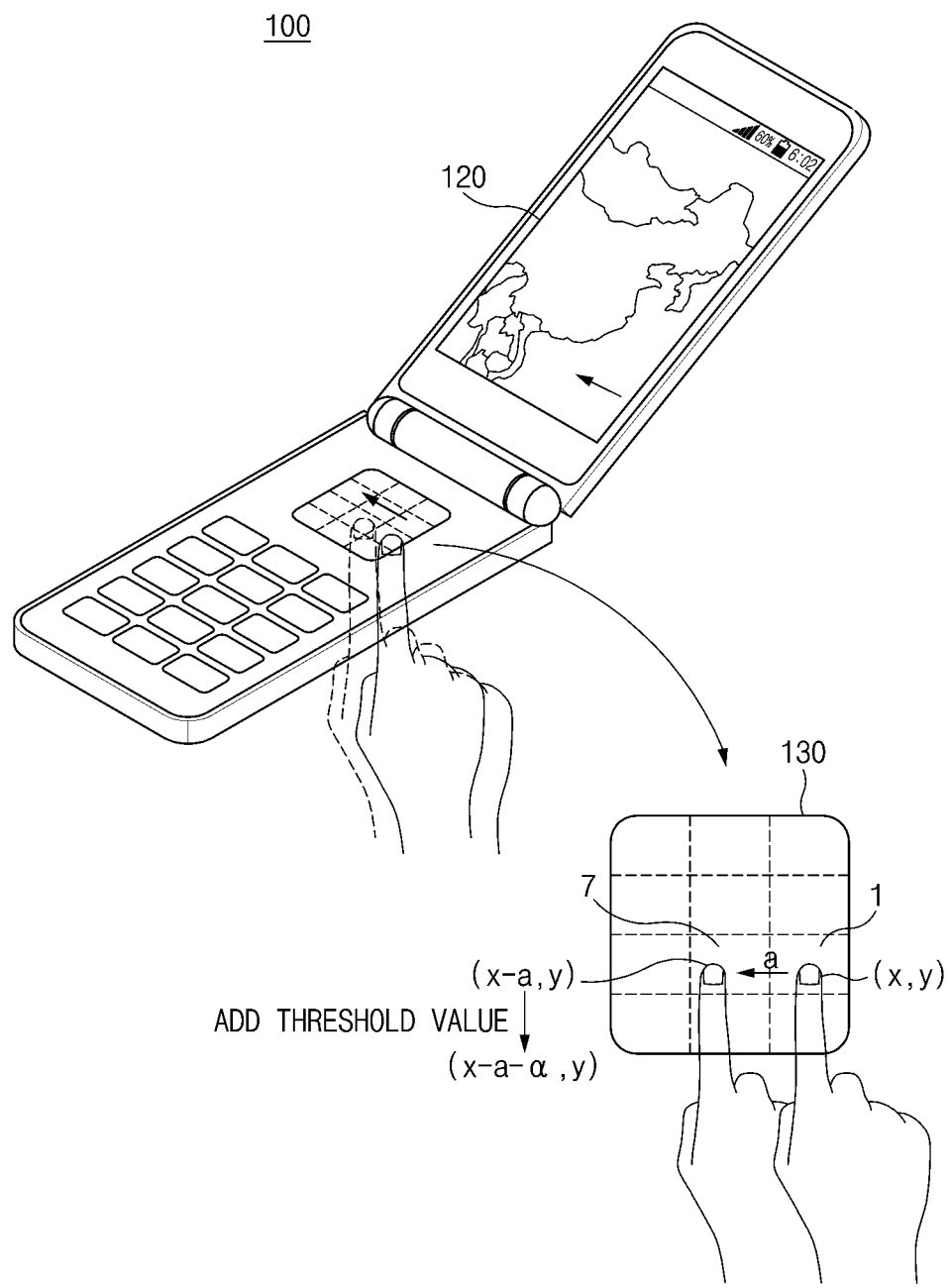
FIG. 4A is a view illustrating one example in which a user input is applied to a touch pad, according to an embodiment.
Figure 4B:
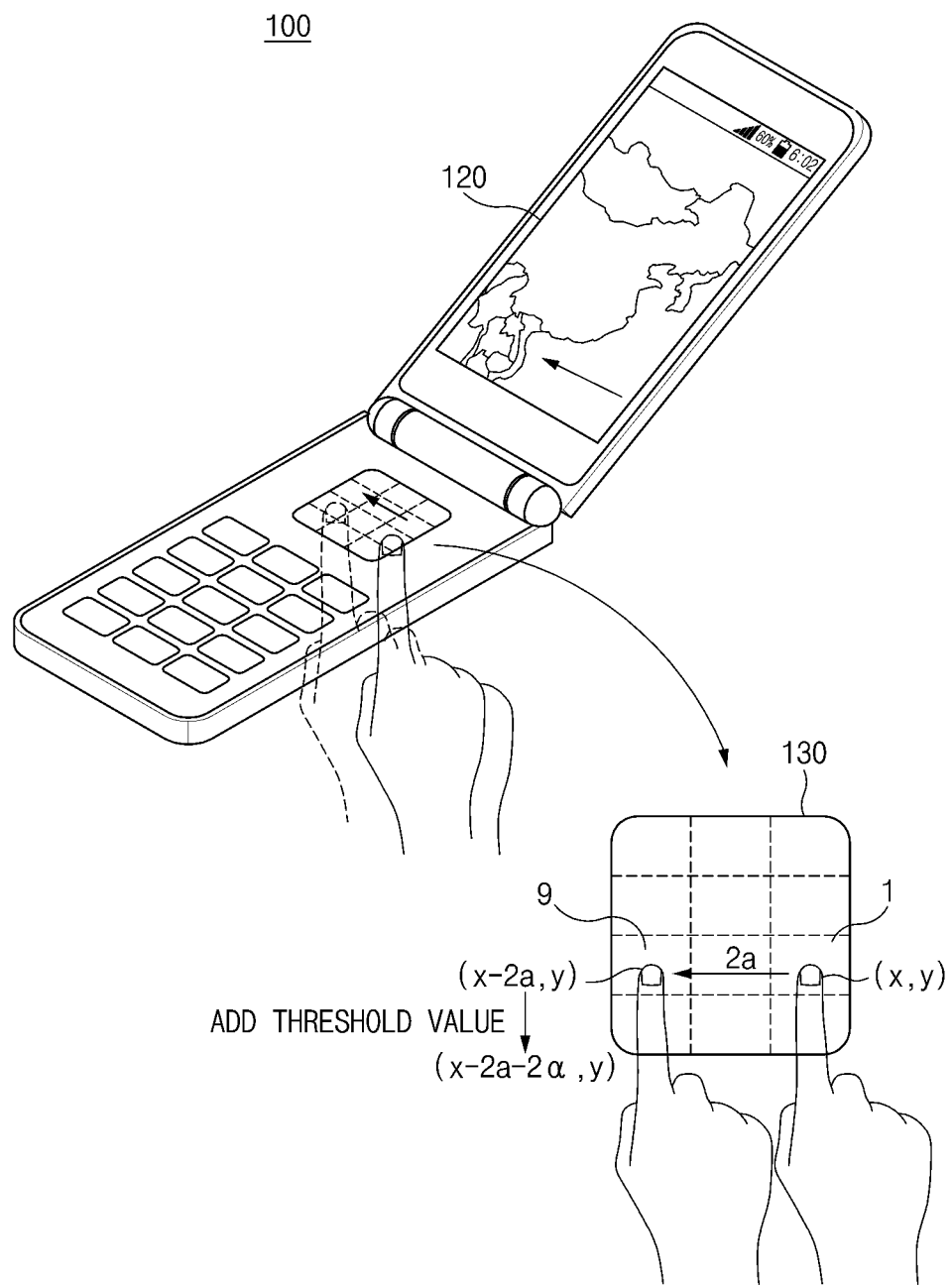
FIG. 4B is a view illustrating another example in which a user input is applied to a touch pad, according to an embodiment.

FIGS. 4A and 4B are views illustrating various examples in each of which a user input is applied to a touch pad, according to an embodiment. In the embodiment below, the function of the input event conversion module 140 of FIG. 2 may be the first function supporting a scroll function.

According to an embodiment, the execution screen (e.g., a world map) of the arbitrary application program 111 of FIG. 2 displayed on the display 120 may require scroll processing in operation. Alternatively, the home screen of the electronic device 100 may be composed of a plurality of sections, and section switch through the scroll processing may be required. In this regard, a user may apply a user input (e.g., sweep) for operating a scroll function on the touch pad 130 that is divided into a plurality of virtual regions (e.g., a lattice-shaped region) by the input event conversion module 140 of FIG. 2.

Referring to FIG. 4A, the input event conversion module 140 may detect the coordinates and speed of the user input. At this time, when the user input is continuous with respect to a plurality of coordinates and the speed of the user input is not less than a specified speed, the processor 160 of FIG. 2 may determine the user input as a sweep operation. In this operation, the input event conversion module 140 may detect a virtual region on which each of the plurality of coordinates is dependent, based on the coordinates (e.g., X value and Y value) of the sweep operation.

In an embodiment, the sweep operation of the user may be continuous from first coordinates (x, y) within the first virtual region 1 to second coordinates (x-a, y) within a second virtual region 7. In this case, for example, the input event conversion module 140 may add a specified threshold value (e.g., α) to the second coordinates (x-a, y), which is coordinates of the end point of the sweep operation, and may transmit, to the processor 160, the first coordinates (x, y) and the second coordinates (x-a-α, y) to which the threshold value (e.g., α) is added.

The threshold value may be a minimum variation between the plurality of coordinates for allowing the processor 160 to determine the sweep operation applied to the touch pad 130, as an event associated with the operation of the scroll function of the screen displayed on the display 120. As such, the processor 160 may determine the sweep operation, which is continuous from the first coordinates (x, y) to the second coordinates (x-a-α, y), as an event to operate a scroll function and may control the scroll processing of a screen (e.g., a world map) displayed on the display 120.

Referring to FIG. 4B, the user input (e.g., sweep) applied to the touch pad 130 may be continuous from the first coordinates (x, y) within the first virtual region 1 to third coordinates (x-2a, y) within a third virtual region 9 at a specified speed or more. The third virtual region 9 may be a virtual region on the same column spaced apart from the first virtual region 1. In this case, the input event conversion module 140 may add a threshold value (e.g., 2α, hereinafter referred to as a second threshold value), which is multiplied by a specified magnification (e.g., 2), to the third coordinates (x-2a, y). In an embodiment, the second threshold value (e.g., 2α) may be associated with the scroll throughput of the screen displayed on the display 120. In this regard, the threshold value (e.g., α, hereinafter referred to as a first threshold value) described in FIG. 4A is the minimum variation between coordinates for operating a scroll function; for example, the scroll processing of the screen for the first threshold value (e.g., α) may be processed once with the specified scroll amount. On the other hand, the scroll processing for the second threshold value (e.g., 2α) having a value greater than the first threshold value (e.g., α) may be processed a plurality of times with a specified scroll amount. Alternatively, the scroll processing for the second threshold value (e.g., 2α) may be processed once with a scroll amount that is relatively great as compared to the first threshold value (e.g., α). Alternatively, the scroll processing for the second threshold value (e.g., 2α) may be processed once with a scroll amount to the end point of the corresponding screen.

The processor 160 may determine the user input (e.g., sweep) as a scroll function operating event for the screen displayed on the display 120 based on the first coordinates (x, y) and the third coordinates (x-2a-2α, y), to which the second threshold value (e.g., 2α) is added, and may control the scroll processing of the corresponding screen.

According to various embodiments, in FIGS. 4A and 4B described above, the user input (e.g., sweep) for operating a scroll function may be applied to virtual regions, which are adjacent to each other or are spaced apart from each other, in at least one direction of the horizontal direction, the longitudinal direction, or the diagonal direction.

Figure 5A:
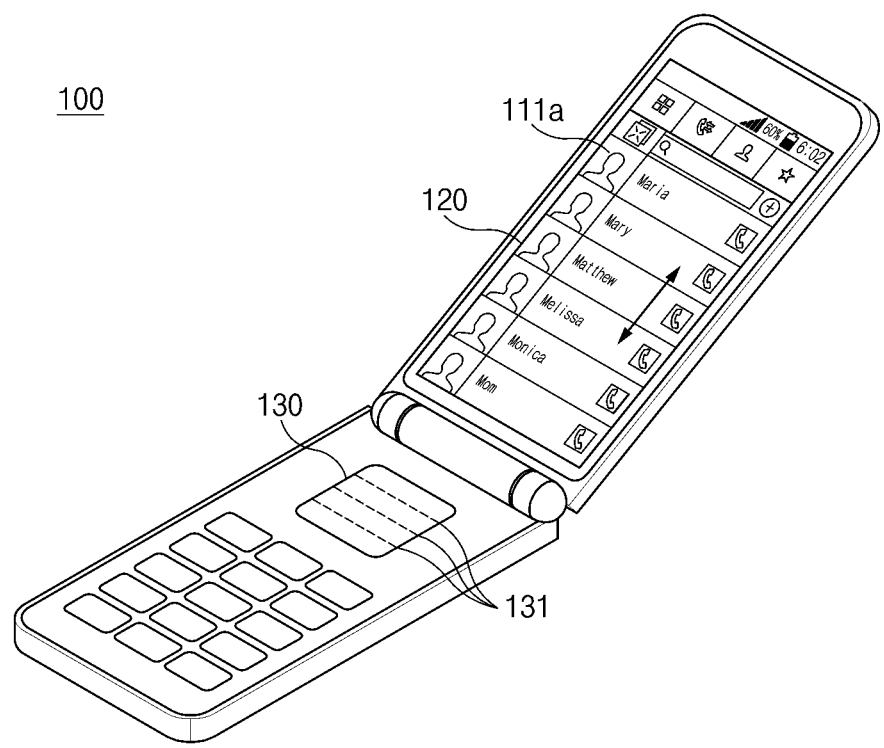
FIG. 5A is a view illustrating one example of a virtual region pattern applied to a touch pad, according to an embodiment.
Figure 5B:
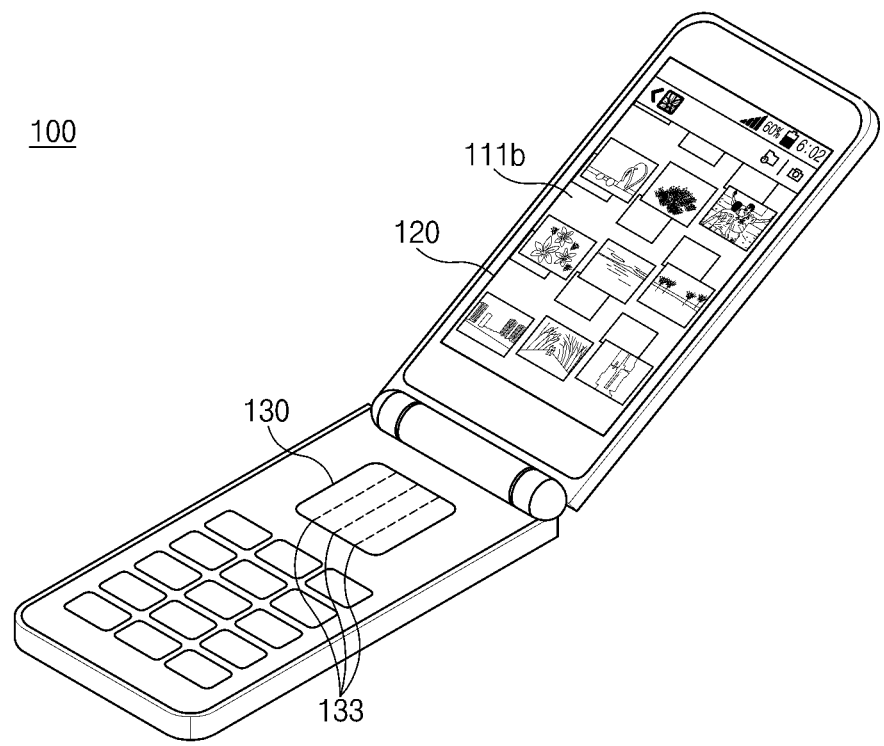
FIG. 5B is a view illustrating another example of a virtual region pattern applied to a touch pad, according to an embodiment.

FIGS. 5A and 5B are views illustrating various examples of a virtual region pattern applied to a touch pad, according to an embodiment. In the embodiment below, the function of the input event conversion module 140 of FIG. 2 may be the first function supporting a scroll function.

The execution screen 111a or 111b of the specific application program 111 of FIG. 2 may be displayed on the display 120, in response to a user's control or the set scheduling information. The application program 111 may receive a control signal associated with the start of program execution, from the processor 160 of FIG. 2; at the same time (or within a specified time from the receipt of the control signal), the application program 111 may transmit, to the input event conversion module 140, scroll direction information of the execution screen displayed on the display 120.

Referring to FIG. 5A, the scroll in the vertical direction may be applied to the layout of the execution screen 111a of the application program 111 (e.g., address book application program). Accordingly, the user input (e.g., sweep) applied to the touch pad 130, which is divided into a plurality of lattice-shaped virtual regions, in a specific direction may be independent of the operation of the scroll function of the execution screen 111a. For example, with respect to the user input (e.g., sweep) that is continuous (or continuous in the horizontal direction) on virtual regions divided by the vertical virtual line among the plurality of lattice-shaped virtual regions, the processor 160 may not perform a control operation for scroll processing of the execution screen 111a.

In an embodiment, the input event conversion module 140 may divide the touch pad 130 into only the virtual line in the specific direction, based on the scroll direction information of the execution screen 111a transmitted from application program 111. For example, as illustrated in FIG. 5A, when the layout of the execution screen 111a is arranged in the vertical direction, the input event conversion module 140 may assign only a plurality of horizontal virtual lines 131 to the touch pad 130 to operate the scroll function in the vertical direction. Thus, the touch pad 130 may be divided into a plurality of bar-type virtual regions in the horizontal direction.

Alternatively, as illustrated in FIG. 5B, when the layout of the execution screen 111b of the application program 111 (e.g., Gallery application program) is arranged in the horizontal direction, the scroll in the horizontal direction may be applied to the corresponding execution screen 111b. As such, as the input event conversion module 140 assigns only a plurality of vertical virtual lines 133 to the touch pad 130, the touch pad 130 may be divided into a plurality of bar-type virtual regions for the vertical direction.

As described above, as a virtual region pattern of the touch pad 130 is implemented based on scroll direction information about the execution screen 111a or 111b of the application program 111, the recognition of the sweep operation of a user for operating a scroll function, the processing of components, or the control operation may be clarified.

Figure 6:
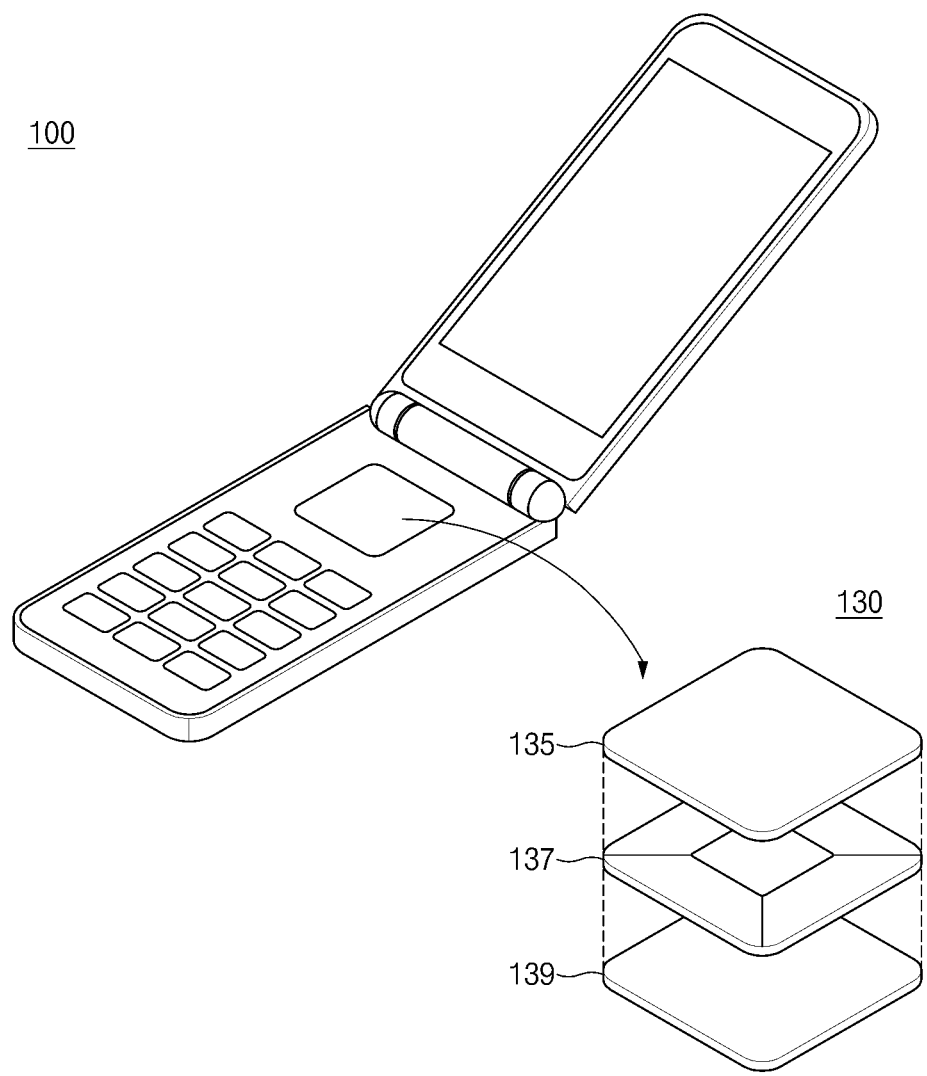
FIG. 6 is a view illustrating a structure of a touch pad, according to various embodiments.

FIG. 6 is a view illustrating a structure of a touch pad, according to various embodiments.

Referring to FIG. 6, the touch pad 130 may be implemented with a structure in which a physical key (e.g., a direction key and a check key) included in the electronic device 100 is stacked. For example, an external cover 135 to which a user input is applied, a physical key 137 (e.g., a direction key and a check key), and at least one electrode layer 139 implementing the touch pad 130 may be stacked in the form the same as or corresponding to each other. Alternatively, at least one electrode layer 139 may be interposed between the external cover 135 and the physical key 137. In the touch pad 130 of the stacked structure, for example, the capacitive scheme may be adapted to the electrode layer 139.

In an embodiment, the initial function of the input event conversion module 140 of FIG. 2 may be the first function supporting a scroll function. In an embodiment, when the user input (e.g., touch) is generated on the touch pad 130 of the stacked structure at a pressure of a specified magnitude or more, the pressure may be applied to the physical key 137. In this case, the physical key 137 may transmit, to the processor 160, the value of the key code (e.g., key code or ASCII code) corresponding to the coordinates of the user input. As such, when the value of a key code corresponding to a direction or check operation is generated in response to a pressure of a specified magnitude or more according to a user input (e.g., touch), the processor 160 of FIG. 2 may exclude a change to the second function (e.g., a function supporting a focus function) for the input event conversion module 140.

Alternatively, when a user input is generated at a pressure less than a specified size and a specified condition (e.g., a condition that all of the plurality of coordinates according to the user input are dependent in a specific virtual region on the touch pad) is satisfied with respect to a function change to the third function for the input event conversion module 140, the processor 160 may activate the function of the input event conversion module 140 as the third function (e.g., a cursor function support function).

An electronic device according to various embodiments described above may include a display displaying an execution screen of an application, a touch pad receiving a user input associated with control of the execution screen, and a processor controlling scroll processing of the execution screen.

According to various embodiments, the processor may be configured to divide the touch pad into a plurality of virtual regions and to add a first threshold value of a minimum magnitude for determining that the continuous user input is a scroll control input of the execution screen, to the second coordinates when the user input is continuous from first coordinates of a first virtual region to second coordinates of a second virtual region adjacent to the first virtual region at more than a specified speed.

According to various embodiments, the processor may be configured to process a scroll degree for the execution screen with a specified first amount, based on the first threshold value.

According to various embodiments, the processor may be configured to add a second threshold value obtained by multiplying the first threshold value by a specified magnification, to the third coordinates, when the user input is continuous from first coordinates of a first virtual region to third coordinates of a third virtual region spaced apart from the first virtual region, which is a column the same as the first virtual region.

According to various embodiments, the processor may be configured to weight a scrolling degree of the execution screen in proportion to the magnification.

According to various embodiments, the processor may be configured to include at least one of a first function associated with an operation of a scroll function of the execution screen, a second function associated with an operation of a focus object, or a third function associated with an operation of a cursor object.

According to various embodiments, the processor may be configured to control an initial function as the first function and to change the second function or the third function to the first function, when the touch pad does not receive a user input during a specified time in a state of the second function or the third function.

According to various embodiments, the processor may be configured to change the first function to the second function, when the user input is held on first coordinates of a first virtual region during a specified time or more.

According to various embodiments, the processor may be configured to change the first function to the third function, when the user input is continuous on a plurality of coordinates within a first virtual region at less than a specified speed.

According to various embodiments, the processor may be configured to organize the plurality of virtual regions as one of a plurality of vertical virtual lines or a plurality of horizontal virtual lines, based on scroll direction information of the execution screen transmitted from the application.

According to various embodiments, the touch pad may be formed of a stacked structure together with at least one physical key provided in the electronic device.

Figure 7:
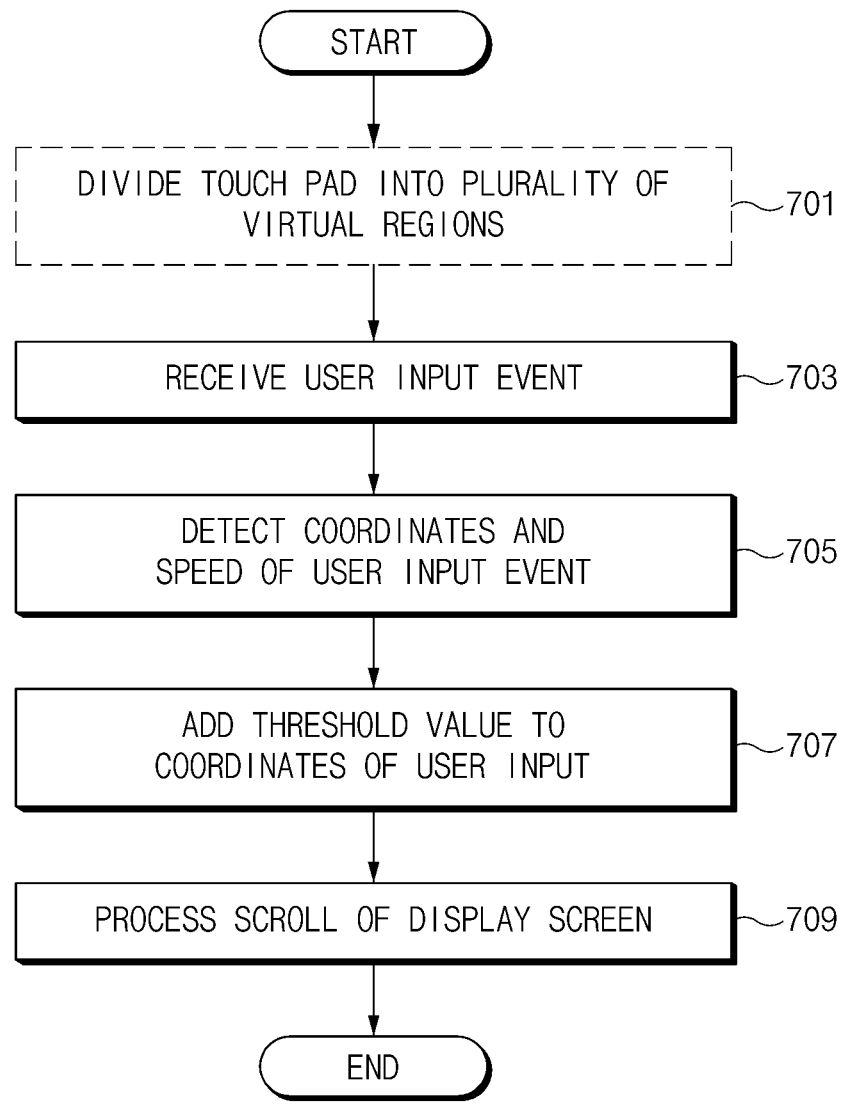
FIG. 7 is a flowchart illustrating a touch pad operating method of an electronic device, according to an embodiment.

FIG. 7 is a flowchart illustrating a touch pad operating method of an electronic device, according to an embodiment. In the following embodiment, the above-described input event conversion module may operate as a function capable of supporting the operation of a scroll function with respect to a screen displayed on a display.

Referring to FIG. 7, in operation 701, the input event conversion module 140 of FIG. 2 may divide the upper surface (or a cover region) of the touch pad 130 of FIG. 2 into a plurality of virtual regions. For example, the input event conversion module may group the coordinates of the internal electrode layer of the touch pad within a specified range and may assign each group as one virtual region. In an embodiment, each virtual region may be formed of an area the same as or corresponding to one another. For example, a plurality of lattice-shaped virtual regions may be implemented by a single combination of virtual regions.

In operation 703, the touch pad may receive a user input applied to at least part of a region of the plurality of virtual regions. For example, the user input may be at least one of a touch operation, a sweep operation, or a drag operation for controlling the execution screen of an application program displayed on the display 120 of FIG. 2.

In operation 705, the input event conversion module may detect at least one virtual region, to which a user input is applied, and coordinates of the user input within the corresponding virtual region. Furthermore, the input event conversion module may detect the speed of the user input that is generated continuously with a plurality of coordinates.

In operation 707, the input event conversion module may add a specified threshold value (e.g., $\alpha$) to a user input (e.g., a sweep operation), which is implemented with a plurality of coordinates and which is continuous at a specified speed or more. For example, when a sweep operation at a specified speed or more is continuous from the first coordinates (e.g., x, y) within a first virtual region to the second coordinates (e.g., x-a, y) within a second virtual region adjacent to the first virtual region among the plurality of virtual regions, the input event conversion module may add a threshold value (e.g., $\alpha$, hereinafter referred to as a first threshold value) to the second coordinates (e.g., x-a, y) that are the coordinates of the end point of the sweep operation. The threshold value may be a minimum variation between the plurality of coordinates for allowing the processor 160 of FIG. 2 to determine that the sweep operation applied to the touch pad is an event associated with the operation of the scroll function of the execution screen.

In various embodiments, when a sweep operation at a specified speed or more is continuous from the first coordinates (e.g., x, y) within the first virtual region to the third coordinates (e.g., x-2a, y) within a third virtual region spaced apart from the first virtual region on the same column as that of the first virtual region, the input event conversion module may add a threshold value (e.g., 2$\alpha$, hereinafter referred to as a second threshold value), which is multiplied by a specified magnification (e.g., 2), to the third coordinates (e.g., x-2a, y). In various embodiments, the above-described sweep operation may be applied to virtual regions, which are adjacent to each other or are spaced apart from each other, in at least one direction of the horizontal direction, the longitudinal direction, or the diagonal direction.

In various embodiments, the input event conversion module may exclude the execution of the operation 701 described above; in an operation of adding the threshold value, the input event conversion module may apply a plurality of virtual regions. In this regard, the input event conversion module may establish a virtual region table of a plurality of coordinates of a touch pad. Each of the plurality of coordinate values of a touch pad on the virtual region table may be included in a specified virtual region. The input event conversion module may determine a virtual region, on which the coordinates of the detected user input is dependent, based on the virtual region table and may perform the above-described operation associated with the adding of a threshold value.

In operation 709, the processor may perform scroll processing on the execution screen of an application program, based on the coordinates of the user input generated on a touch pad. For example, the processor may process the scroll processing of the user input, to which the first threshold value is added, with a specified scroll amount once. Alternatively, the processor may process the scroll processing of the user input, to which the second threshold value is added, with the specified scroll amount a plurality of times. Alternatively, the processor may process scroll processing of the second threshold value once with a scroll amount greater than that of the first threshold value.

Figure 8:
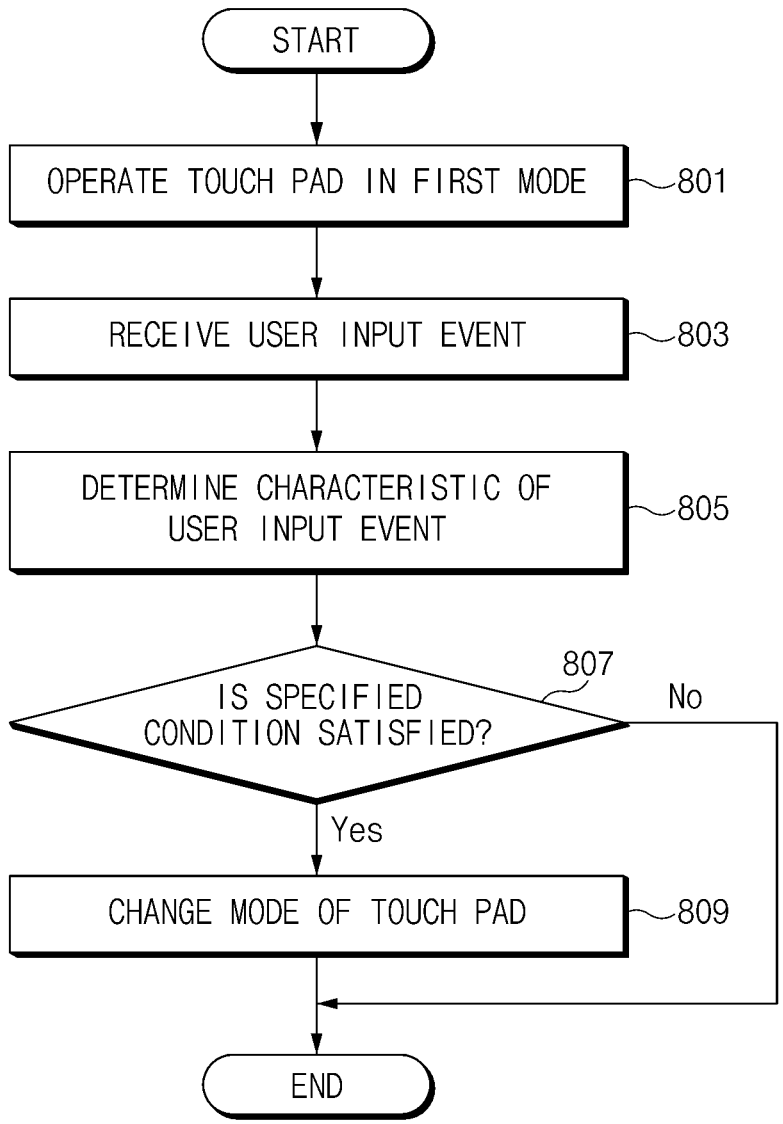
FIG. 8 is a flowchart illustrating a touch pad operating method of an electronic device, according to another embodiment.

FIG. 8 is a flowchart illustrating a touch pad operating method of an electronic device, according to another embodiment.

In operation 801, under the control of the processor 160 of FIG. 2 or in response to the set scheduling information, the initial function of the input event conversion module 140 of FIG. 2 may operate as the first function associated with the operating a scroll function of a screen displayed on the display 120 of FIG. 2.

In operation 803, a user input may be applied to the touch pad 130 of FIG. 2, which is divided into a plurality of virtual regions (e.g., a plurality of lattice-shaped virtual regions), by an input event conversion module.

In operation 805, the processor may determine the characteristic of the user input applied to the touch pad. In an embodiment, the determination of the characteristic may be based on the coordinates and speed of the user input. For example, when the user input is implemented with single coordinates, the processor may determine the user input as a touch operation. Alternatively, when the user input is implemented with a plurality of coordinates, the processor may determine the user input as either the sweep operation or the drag operation. In this operation, when the speed between the coordinates of the start point and the coordinates of the end point according to a user input among the plurality of coordinates is not less than the specified speed, the processor may determine the user input implemented with a plurality of coordinates, as a sweep operation.

In operation 807, when it is determined that the user input is a touch operation and when the touch operation is held during a specified time or more, in operation 809, the processor may change or switch the first function, which is the initial function of the input event conversion module, to a second function supporting the operation of a focus object on a display.

Alternatively, in operation 807, when it is determined that the user input is a drag operation and when the drag operation is continuous on a plurality of coordinates within a specific virtual region among a plurality of virtual regions of the touch pad, in operation 809, the processor may change or switch the function of the input event conversion module from the first function to a third function supporting the operation of a cursor object on the display.

A touch pad operating method according to various embodiments described above may include displaying an execution screen of an application, dividing the touch pad into a plurality of virtual regions, receiving a user input in at least part of the plurality of virtual regions, and when the user input is continuous from first coordinates of a first virtual region to second coordinates of a second virtual region adjacent to the first virtual region at a specified speed or more, adding a first threshold value of a minimum magnitude for determining that the continuous user input is a scroll control input of the execution screen, to the second coordinates.

According to various embodiments, the adding may include adding a second threshold value obtained by multiplying the first threshold value by a specified magnification, to the third coordinates, when the user input is continuous from first coordinates of a first virtual region to third coordinates of a third virtual region spaced apart from the first virtual region, which is a column the same as the first virtual region.

According to various embodiments, the touch pad operating method may further include processing a scrolling degree for the execution screen with a specified first amount, based on the first threshold value and weighting a scrolling degree of the execution screen in proportion to the magnification.

According to various embodiments, the touch pad operating method may further include operating the electronic device with at least one function of a first function associated with an operation of a scroll function of the execution screen, a second function associated with an operation of a focus object, or a third function associated with an operation of a cursor object.

According to various embodiments, the operating may include controlling an initial function of the electronic device as the first function.

According to various embodiments, the operating may include changing the first function to the second function, when the user input is held on first coordinates of a first virtual region during a specified time or more.

According to various embodiments, the operating may include changing the first function to the third function, when the user input is continuous on a plurality of coordinates within a first virtual region at less than a specified speed.

According to various embodiments, the dividing may include organizing the plurality of virtual regions as one of a plurality of vertical virtual lines or a plurality of horizontal virtual lines, based on scroll direction information of the execution screen of the application.

Figure 9:
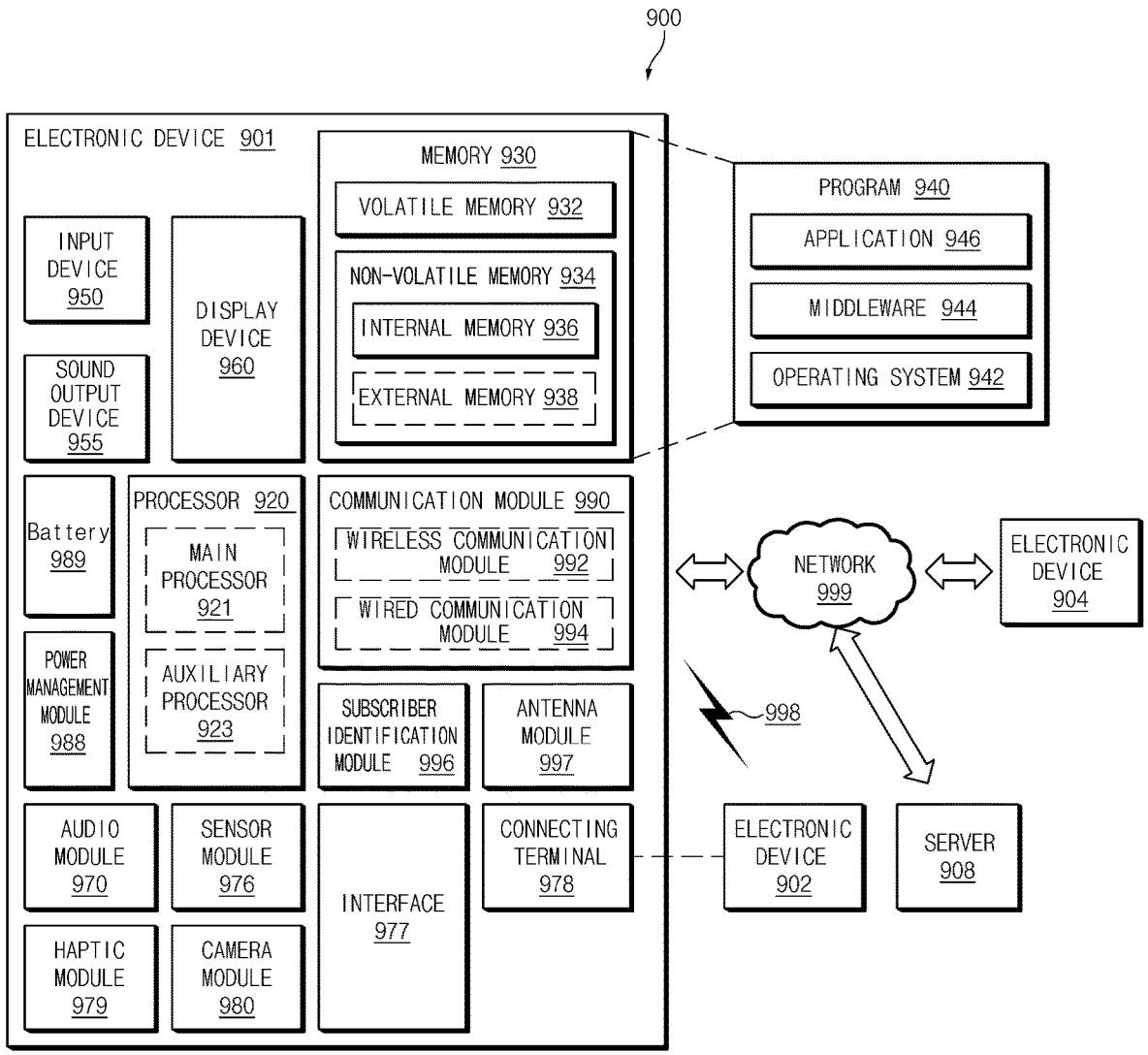
FIG. 9 is a diagram illustrating an electronic device in a network environment, according to an embodiment.

FIG. 9 is a block diagram illustrating an electronic device 901 in a network environment 900 according to various embodiments. Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 997. In some embodiments, at least one (e.g., the display device 960 or the camera module 980) of the components may be omitted from the electronic device 901, or one or more other components may be added in the electronic device 901. In some embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901.

The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, or a keyboard.

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to an embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment, the audio module 970 may obtain the sound via the input device 950, or output the sound via the sound output device 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector), The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to an embodiment, the antenna module 997 may include one or more antennas, and, therefrom, at least one antenna appropriate for a communication scheme used in the communication network, such as the first network 998 or the second network 999, may be selected, for example, by the communication module 990 (e.g., the wireless communication module 992). The signal or the power may then be transmitted or received between the communication module 990 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a display;
   a touch pad spaced from the display; and
   a processor configured to:
   control the display to display an execution screen of an application,
   divide the touch pad into a plurality of regions based on a plurality of coordinates, and
   receive a user input on a first region among the plurality of regions,
   in response to detecting that the user input continuously moves from the first region to a second region adjacent to the first region, a first weight value to a magnitude for determining a scrolling degree of the execution screen,
   in response to detecting that the user input continuously moves from the first region to a third region which is spread apart from the first region and is located on a same line with the first region and the second region apply a second weight value to the magnitude, wherein the second weight value is greater than the first weight value, and
   control the display to scroll the execution screen according to the magnitude applied by the first weight or the second weight value.

2. The electronic device of claim 1, wherein the processor is configured to:
   operate at least one of a first function associated with an operation of a scroll function of the execution screen, a second function associated with an operation of a focus object, or a third function associated with an operation of a cursor object.

3. The electronic device of claim 2, wherein the processor is configured to:
   control, as an initial function, the first function; and
   in response to detecting that the touch pad does not receive the user input during a specified time in a state of the second function or the third function, change the second function or the third function to the first function.

4. The electronic device of claim 3, wherein the processor is configured to:
   in response to detecting that the user input is held on the first region during a specified time or more, change the first function to the second function.

5. The electronic device of claim 3, wherein the processor is configured to:
   in response to detecting that the user input continuously moves on a plurality of coordinates within the first region at less than a specified speed, change the first function to the third function.

6. A touch pad operating method of an electronic device including a touch pad, the method comprising:
   displaying an execution screen of an application;
   dividing the touch pad into a plurality of regions based on a plurality of coordinates;
   receiving a user input on a first region among the plurality of regions;
   in response to detecting that the user input continuously moves from the first region to a second region adjacent to the first region, applying a first weight value to a magnitude for determining a scrolling degree of the execution screen, or, in response to detecting that the user input continuously moves from the first region to a third region which is spaced apart from the first region and is located on a same line with the first region and the second region, applying a second weight value to the magnitude wherein the second weight value is greater than the first weight value: and
   scrolling the execution screen according to the magnitude applied by the first weight value or the second weight value.

7. The method of claim 6, further comprising:
   operating the electronic device with at least one function of a first function associated with an operation of a scroll function of the execution screen, a second function associated with an operation of a focus object, or a third function associated with an operation of a cursor object.

8. The method of claim 7, wherein the operating includes:
   controlling, as an initial function of the electronic device, the first function.

9. The method of claim 8, wherein the operating includes:
   in response to detecting that the user input is held on the first region during a specified time or more, changing the first function to the second function.

10. The method of claim 8, wherein the operating includes:
   in response to detecting that the user input continuously moves on a plurality of coordinates within the first region at less than a specified speed, changing the first function to the third function.

* * * * *